Patented Jan. 12, 1932

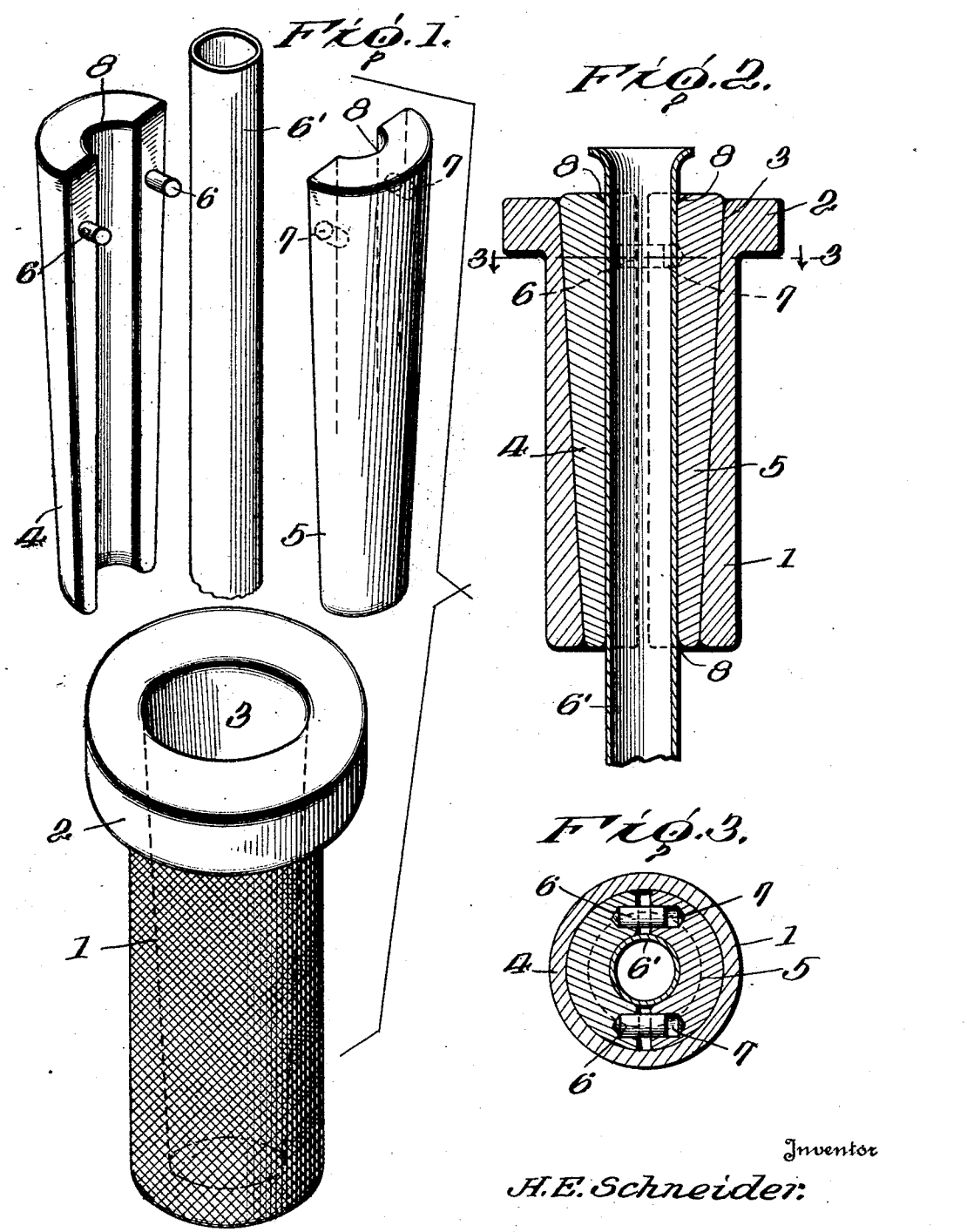

1,840,470

UNITED STATES PATENT OFFICE

HENRY E. SCHNEIDER, OF ERIE, PENNSYLVANIA, ASSIGNOR TO HAYS MANUFACTURING CO., OF ERIE, PENNSYLVANIA, A CORPORATION OF PENNSYLVANIA

WORK HOLDER

Application filed February 19, 1929. Serial No. 341,069.

This invention relates to certain new and useful improvements in work holders and more particularly to a work holder especially adapted to be used for holding a tube while bending or flanging the same, the object being to provide a holder with a pair of gripping jaws which will hold the tube firmly and in such a manner that all danger of bending or upsetting the tube is prevented.

Another object of my invention is to provide a work holder which is so constructed that it can be readily placed in position over a tube or a tube can be placed in position within the holder and held in such a manner that it can be readily operated upon by the flanging tool or bending tool.

Another object of my invention is to provide a work holder having a tapering bore in which is mounted a pair of wedge-shaped gripping jaws which are adapted to receive and hold the tube so that the more pressure is brought to bear on the end of the tube, the tighter the jaws will grip the tube in order to hold it firmly and in such a manner that the tube is prevented from being injured while being held.

A still further object of the invention is to provide a holder which is exceedingly simple and cheap in construction and one which can be readily moved from place to place so that it can be readily carried to the point of operation, thereby overcoming the difficulties of having to use a heavy vise for holding the tube.

A still further object of the invention is to provide a work holder which can be readily held in the hand of the operator or by any other suitable support so that the tube when placed in position therein will be held firmly by the gripping jaws and yet be capable of being readily removed therefrom by simply tapping the outside of the holder to loosen the jaws.

Other and further objects and advantages of the invention will be hereinafter set forth and the novel features thereof defined by the appended claim.

In the drawings,

Figure 1 is a perspective view of my improved construction of work holder with the parts separated and a tube in position to be inserted within the holder;

Figure 2 is a vertical section through the holder showing the tube in position therein; and Figure 3 is a section taken on line 3—3 of Figure 1.

In the embodiment of my invention as herein shown, the body 1 is cylindrical and is provided with a milled surface as clearly shown having an annular flange 2 at one end and provided with a tapering bore 3. While I have shown the body of the holder formed cylindrical, it is, of course, understood that it can be formed of any shape desired to facilitate the holding of the same by the operator or to provide means for supporting the same in various ways.

Slidably mounted within the tapering bore of the holder is a pair of tapering jaws 4 and 5, the taper of which corresponds to the taper of the bore and in the embodiment of my invention as herein shown, these jaws are preferably semi-circular in cross section in order to provide grooved inner-faces to receive and hold firmly a pipe 6' when placed between the same.

While in the drawings I have shown these jaws substantially semi-circular in cross section in order to produce, when joined together, a tapering outer wall for each jaw, I am aware that the outer faces can be formed of various shapes and that the tapering bore 3 of the holder can be formed of various shapes so as to correspond with the shape of the jaws, so long as these jaws are tapering from end to end and that the bore 3 of the holder has substantially the same taper.

The jaw 4 adjacent one end is provided with outwardly projecting pins 6 which are adapted to extend into suitable recesses 7 formed in the jaw 5, whereby these jaws are interlocked together so that they move longitudinally within the tapering bore of the holder in unison when the pipe is being gripped by the jaws to firmly hold it throughout their length. The grooves formed in the inner faces of the jaws are rounded at their ends as shown at 8.

By constructing a work holder of a body member with separable wedging jaws, the holder can be readily placed in position over the tube or a tube can be readily placed in position within the holder so that the end of the tube can be flanged or bent by a suitable flanging or bending tool.

When the tube is being flanged as shown at Figure 2, the pressure of the flanging tool against the end of the tube forces the jaws into the tapering bore so as to firmly grip the tube and hold it between the jaws in such a manner that all danger of the tube being bent or upset while being flanged or bent is prevented.

In operation in inserting a tube into the jaws, the jaws are raised vertically or out of the tapering bore of the holder so that the jaws are separated slightly, which allows the tube to be readily forced between the jaws and by then forcing the jaws into the holder and giving the jaws a tap, the tube will be thoroughly clamped between the same. When it is desired to remove the tube from the holder, it is only necessary to tap the outside of the holder with a hammer, which will loosen the jaws and allow the jaws to be withdrawn from the holder to remove the pipe therefrom.

In case it is desired to flange a pipe having one of its ends fixed, the holder is first slipped over the end of the pipe and the jaws are then placed around the pipe and forced into the holder so as to thoroughly grip the pipe and hold it in position to be operated on.

By providing an annular flange around one end of the holder, the same can be supported in various ways and when held by the operator, the holder is prevented from slipping through the hand.

While I have shown certain details of construction and operation of my improved construction of work holder, I am aware that various changes can be made without departing from the spirit of my invention, which consists in providing a body having a tapering opening in which are slidably mounted a pair of tapering jaws having registering grooves and provided with outer faces corresponding in shape to the shape of the opening of the body and provided with interlocking means for slidably connecting the jaws together so as to cause them to move in unison as they move into and out of the holder.

What I claim is:—

A work holder for tubing, said work holder comprising an elongated tubular body having an outwardly extending flange at one end and having a central circular tapering opening extending along its length, a pair of pipe-clamping members adapted to slidably register in said tapering opening, one of said members having a socket formed therein and the other of said members having a pin extending therefrom to enter the socket in the first member, each of said clamping members being substantially semi-circular and of tapering thickness, and having a smooth semi-circular central groove in its work-holding face, said body being adapted to be held in the hand with said flange abutting the hand.

In testimony whereof I hereunto affix my signature.

HENRY E. SCHNEIDER.